(12) United States Patent
Dawe et al.

(10) Patent No.: US 7,042,594 B1
(45) Date of Patent: May 9, 2006

(54) SYSTEM AND METHOD FOR SAVING HANDWRITING AS AN ANNOTATION IN A SCANNED DOCUMENT

(75) Inventors: Julie T Dawe, Ft Collins, CO (US); Bryan P Dawe, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/521,000

(22) Filed: Mar. 7, 2000

(51) Int. Cl.
*H04N 1/40* (2006.01)

(52) U.S. Cl. ........................................ 358/2.1; 382/176
(58) Field of Classification Search ................ 358/1.9, 358/2.1, 452–453, 462; 382/176–179
See application file for complete search history.

(56) References Cited

U.S. PATENT DOCUMENTS

| | | | |
|---|---|---|---|
| 4,748,678 A | | 5/1988 | Takeda et al. |
| 5,075,787 A | * | 12/1991 | Shaughnessy et al. ...... 358/452 |
| 5,138,465 A | * | 8/1992 | Ng et al. ..................... 358/453 |
| 5,274,468 A | * | 12/1993 | Ojha .......................... 358/448 |
| 5,404,294 A | * | 4/1995 | Karnik ....................... 715/507 |
| 5,436,735 A | * | 7/1995 | Tanabe et al. .............. 358/453 |
| 5,579,407 A | * | 11/1996 | Murez ........................ 382/164 |
| 5,761,485 A | * | 6/1998 | Munyan ..................... 345/839 |
| 6,072,598 A | * | 6/2000 | Tso ............................ 358/442 |
| 6,272,484 B1 | * | 8/2001 | Martin et al. ................. 707/1 |

FOREIGN PATENT DOCUMENTS

| | | |
|---|---|---|
| EP | 0202671 A2 | 5/1986 |
| EP | 0543599 A2 | 11/1992 |
| EP | 0996080 A2 | 8/1999 |
| GB | 2167264 A | 10/1985 |
| GB | 2203014 A | 3/1988 |
| GB | 2261792 A | 11/1992 |
| JP | 4134567 | 5/1992 |
| JP | 6340981 | 12/1994 |

* cited by examiner

*Primary Examiner*—Thomas D. Lee
*Assistant Examiner*—Stephen Brinich

(57) ABSTRACT

A system and method for saving handwriting in a scanned image as an annotation is disclosed. Automatic annotation logic recognizes the presence of handwriting in a scanned image and saves the handwriting as an annotation. Alternatively, a user of the scanner may identify the handwriting to be saved as an annotation or the automatic annotation logic may identify a notation including handwriting on the scanned page. Optionally, further processing may be applied to remove the appearance of the notation and/or the handwriting from the preview scan feature or from the document generated from the scanned image. Once saved as an annotation in the saved document, the handwriting may be maintained as not visible in the document or may be made visible by the user of the scanner. By saving handwriting as an annotation, a version closer to that of the original version of the document is available to the user, thus reducing clutter in the image presented to the user, while maintaining the information conveyed by the handwriting for presentation to the user if desired.

34 Claims, 4 Drawing Sheets

SYSTEM AND METHOD FOR SAVING HANDWRITING AS AN ANNOTATION IN A SCANNED DOCUMENT

TECHNICAL FIELD

The present invention relates generally to electronic scanning devices, and, more particularly, to a system and method for saving handwriting in a scanned document as an annotation in the document.

BACKGROUND OF THE INVENTION

Scanning devices are useful in many applications where it is desirable to transfer an image from printed form into electronic form. Scanners capable of reading and converting a page into electronic format have been available for quite some time. Typically, a scanner will electronically read a page and electronically store the information for later presentation and use.

Typically, a scanner will electronically read a page, classify the different types of images on the page and electronically store the information for later presentation and use. The types of classifications of a scanned page typically include text, photographs, drawings, charts, tables, business graphics, equations, handwriting, logos, etc. Alternatively, a user can classify these different parts of a scanned image into regions after the scanner has scanned the page. Some scanners are capable of determining the classifications of particular regions of a scanned page in accordance with predetermined instructions.

Oftentimes, a scanned image includes handwritten comments written directly on the page that is scanned. Conventional scanning techniques and systems scan the entire page and present to a user all of the information in the scanned image that the scanning system deems as relevant. If there is handwriting on the original image, the scanning system might attempt to use an optical character recognition (OCR) program on the handwriting, but this usually results in the handwriting being interpreted as stray markings (i.e., garbage). Alternatively, the handwriting may be saved as an image and presented to the user. In yet another alternative, the handwriting detected in a scanned image may be classified as unusable and eliminated from the scanned image by the processing system.

Unfortunately, this leads to scanned images that are cluttered and leave the user no manner in which to conveniently remove the handwriting from the scanned image. In a worst case, important handwriting may be eliminated altogether from the scanned image by the processing system.

Therefore, it would be desirable to have the ability to control the manner in which handwriting on a scanned image is saved, and have the ability to present the user with options regarding the manner in which the handwriting is presented in the scanned image.

SUMMARY OF THE INVENTION

The invention provides a system and method for saving handwriting in a scanned image as an annotation in the document.

Architecturally, the present invention can be conceptualized as a system for saving handwriting in a scanned image as an annotation. The system includes a scanner, a document analysis and processing software component in communication with the scanner, and automatic annotation logic in communication with the document analysis and processing software component. The automatic annotation logic is configured to detect a region in a scanned image, the region including handwriting, and save the handwriting as an annotation in a document generated from the scanned image.

The present invention may also be conceptualized as a method for saving handwriting in a scanned image as an annotation. The method includes the steps of scanning an image in a scanner, detecting a region in the scanned image, the region including handwriting, and saving the handwriting in the detected region as an annotation in a document generated from the scanned image.

The invention has numerous advantages, a few of which are delineated, hereafter, as merely examples.

An advantage of the invention is that it enables a user of a scanner to control the manner in which handwriting or notations are saved and presented in the document that is generated from the scanned image.

Another advantage of the invention is that it enables the user of a scanner to control the manner in which handwriting or notations are presented in a preview image shown to the user.

Another advantage of the invention is that it improves the appearance of a document saved from a scanned image that includes handwriting or notations.

Another advantage of the invention is that it allows the user of a scanner to view a document generated from a scanned image that contained handwriting or notations without the handwriting or notations so that the look of the original document may be preserved and viewed.

Another advantage of the invention is that because the handwriting is saved as an annotation it is always available to the user in electronic format.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

The automatic annotation logic of the present invention can be implemented in software, hardware, or a combination thereof. In a preferred embodiment(s), the automatic annotation logic is implemented in software or firmware that is stored in a memory and that is executed by a suitable instruction execution system (microprocessor). If implemented in hardware, as in an alternative embodiment, the automatic annotation logic can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Furthermore, the automatic annotation software, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Moreover, while the automatic annotation logic will be illustrated hereafter with respect to the recognition of handwriting in a scanned document, the automatic annotation logic is useful for automatically recognizing other attributes of a scanned image, and saving them as annotations to the document, for example but not limited to drawings, photographs, equations, graphics, lineart, etc.

Figure 1:
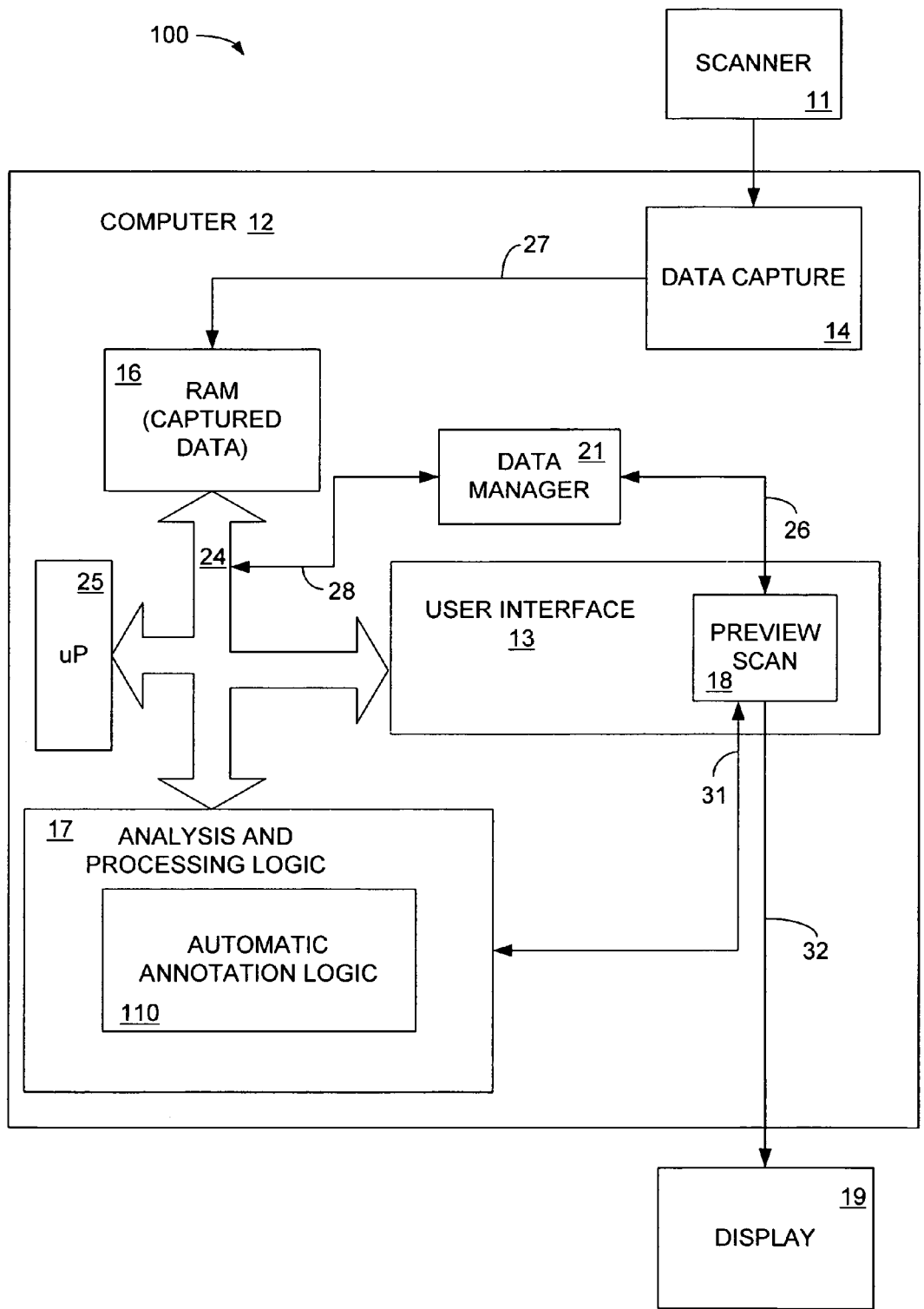
FIG. 1 is a schematic view of an exemplar scanner and computer system in which the automatic annotation logic of the present invention resides.

Turning now to FIG. 1, shown is a schematic view of an exemplar scanner and computer system 100 in which the automatic annotation logic 110 of the present invention resides.

Illustratively, scanner 11 scans a document placed therein in cooperation with computer 12. Computer 12 can be any general purpose computer that is capable of connecting to and executing the software that enables scanner 11 to function. Illustratively, computer 12 is a personal computer, however, computer 12 may be any computer capable of communicating with scanner 11. A scanned image is captured by data capture element 14 located within computer 12. The scanned image data is illustratively stored in random access memory (RAN) 16. RAM 16 communicates with analysis and processing logic 17, user interface 13 and microprocessor (uP) 25 over bus 24.

Analysis and processing logic 17, together with automatic annotation logic 110, is illustratively the logic that operates in conjunction with scanner 11 to determine the region of the scanned image within which to inspect for handwriting in the scanned image. Alternatively, analysis and processing logic 17, together with automatic annotation logic 110, may inspect the image for the presence of a notation, such as a "POST-IT®" note on the document. If such a notation is detected on the scanned document, the logic will analyze any handwriting present on the notation and automatically save that handwriting as an annotation in the document saved from the scanned document, as will be described more fully below.

All identifying elements of a scanned image, such as type, location and statistics of the scanned image are captured by data capture element 14 and stored as captured data in RAM 16. Furthermore, analysis and processing logic 17 in conjunction with uP 25 is the underlying processing engine that maintains the scanned image data. Analysis and processing logic 17 includes automatic annotation logic 110, which will be described in greater detail below with respect to FIG. 2. Automatic annotation logic 110 resides within analysis and processing logic 17, which communicates with data manager 21 over bus 24 and connection 28. Data manager 21 communicates with bus 24 over connection 28 in order to access the data stored in RAM 16 in order to perform the preview scan operation or other post analysis tasks. Preview scan is a feature of many scanner programs and enables a user to preview the scanned image on a computer monitor prior to scanning and saving the document. In this manner, the user of a scanner may decide the appearance of the document prior to saving. As will be discussed below, some of the document processing features of the invention will interact with the preview scan feature. However, the present invention is not reliant upon the preview scan operation. Indeed, the preview scan operation may be omitted in some applications, for example when batch processing. Post analysis tasks may include, for example, printing, faxing, optical character recognition, etc.

In one particular embodiment of the invention, the automatic annotation logic 110 enables the analysis and processing logic 17 to recognize a predetermined portion, or region, of a scanned image in which a user has indicated the presence of text. For example, a user might instruct the scanner software to inspect the upper right hand portion of a scanned image for handwriting, which will be saved as an annotation to the scanned document.

Typically, the scanner analysis and processing logic will divide the scanned document into different regions, depending upon the information contained in the document. For example, assuming that there are both text and a photograph in the document, the scanner analysis and processing logic recognizes the two different types of information (text and a photograph) and assigns each of the different types of information to a region. The text is one region and the photograph is another region. Alternatively, a user of the scanner may manipulate and assign different regions to the different types of information. The technology used to define and assign different regions will not be described in detail. Many other types of information may be included in a document and assigned a region and an information type.

In another embodiment of the invention, automatic annotation logic 110 enables the analysis and processing logic 17 to recognize the presence of handwriting in the scanned document, whether alone or on a notation on the document, and save the handwriting as an annotation to the document. If a notation is detected, then the automatic annotation logic 110 will analyze the notation for handwriting and save that information as an annotation.

Illustratively, by indicating a particular portion of the scanned document to the analysis and processing logic 17, a user may indicate a region of interest by interacting with the software and using a mouse and pointer to draw a bounding box around a portion of the scanned image that the user desires the software to analyze. Alternatively, a user could draw a bounding box and use the above-mentioned region selection method to type the region of interest as "handwriting". When scanned, the software analyzes the previously indicated region of interest for handwritten text and saves that handwriting as an annotation to the document.

Similarly, the analysis and processing logic 17, together with the automatic annotation logic 110, may use a color and hue recognition technique to locate a notation on the page. Any writing on the notation would then be saved as an annotation to the scanned image.

Also included in computer 12 is user interface 13, which illustratively includes preview scan block 18. Preview scan 18 allows a user of a scanner to view the document to be scanned prior to final scanning, or otherwise, prior to sending the appropriate scanned data regions to downstream destinations (applications, storage, etc.). Preview scan 18 outputs the scanned image on connection 32 for output to a user on display 19.

Figure 2:
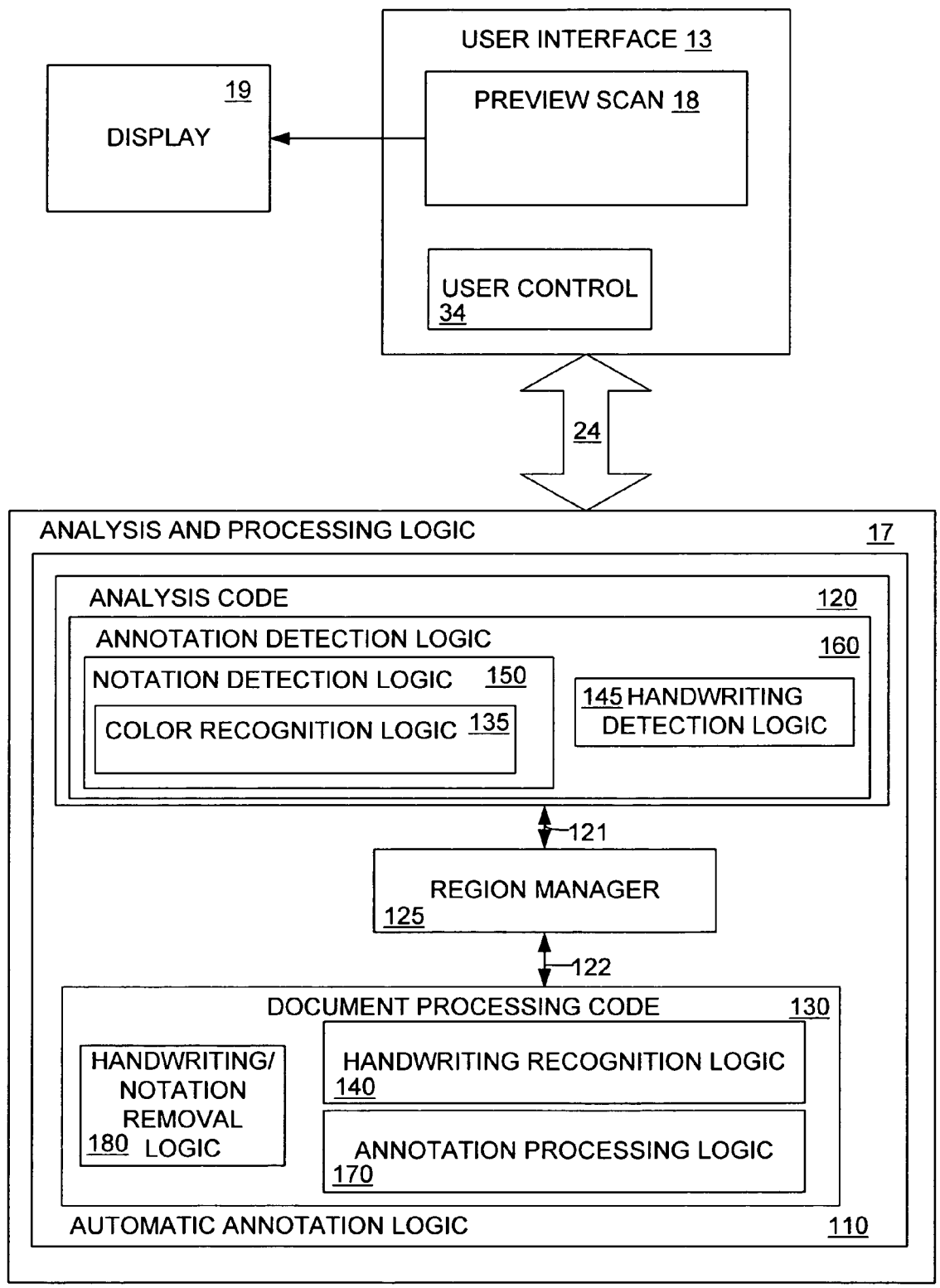
FIG. 2 is a schematic view illustrating the user interface and analysis and processing logic of FIG. 1 in which the logic of the present invention resides.

FIG. 2 is a schematic view illustrating the user interface 13 and analysis and processing logic 17 of FIG. 1, in which the automatic annotation logic 110 of the present invention resides. User interface 13 includes preview scan block 18 and user control 34. User control 34 may include any available means or method for interacting with the computer, and commonly includes a mouse, a stylus, or a computer keyboard. User control 34 can be used to communicate the region of the scanned page, in which the user has inserted handwriting. As discussed above, in some applications such as batch processing, the preview scan operation, and any user interaction may be omitted.

Automatic annotation logic 110 resides within analysis and processing logic 17 and contains the logic necessary to allow a scanner to automatically recognize handwriting in a scanned image. Handwriting can be recognized and interpreted whether written directly on the document, or whether written on a notation applied to the document. Automatic annotation logic 110 includes analysis code 120, region manager 125 and document processing code 130.

If a region in a scanned image is defined by a user as the region in which handwriting is located, the annotation detection logic 160 uses handwriting detection logic 145 to detect handwriting in the selected region. Once the handwriting is detected, handwriting recognition logic 140 is used to analyze the handwriting so that the handwriting may be saved as an annotation to the scanned image by the annotation processing logic 170.

Alternatively, the automatic annotation logic 110 can be configured to search the entire document for the presence of handwriting. In such a case, the annotation detection logic 160 uses handwriting detection logic 145 to detect handwriting anywhere in the document. Then, in similar fashion to that described above, once the handwriting is detected, handwriting recognition logic 140 is used to analyze the handwriting so that the handwriting may be saved as an annotation to the scanned image.

If the scanner software is configured by a user to search the scanned image for a notation, then analysis code 120 uses notation detection logic 150 to detect the presence of the notation. Notation detection logic 150 includes color recognition logic 135, which can detect the presence of color, such as in the case of a notation having a color different than that of the scanned page. Once the notation is detected, the document processing code 130 uses handwriting recognition logic 140 to read the handwriting from the notation, and uses annotation processing logic 170 to save the handwriting as an annotation to the scanned document.

Document processing code 130 also includes handwriting/notation removal logic 180. Handwriting/notation removal logic 180 may optionally be used to remove the appearance of the handwriting or notation in the preview image presented to the user via the above described preview scan feature. One possible way to do this is to fill the region boundaries with the background color of the document (usually white). Although described herein as handwriting/notation removal logic 180, the logic can be used to clear any region in the document.

In addition, handwriting/notation removal logic 180 may also optionally be used to remove the appearance of the handwriting or notation from the saved document. Typically, the use of handwriting/notation removal logic 180 on handwriting or notations on the preview image would help the user of the scanner decide whether or not they would like to apply this removal logic to the saved document.

User interface 13 communicates with analysis and processing logic 17 over bus 24. If the user desires, preview scan 18 displays the handwriting region detected by the automatic annotation logic 110 on display 19. Once the document is viewed on display 19 during the preview scan operation 18, the user has an opportunity to manipulate the handwriting region.

Figure 3:
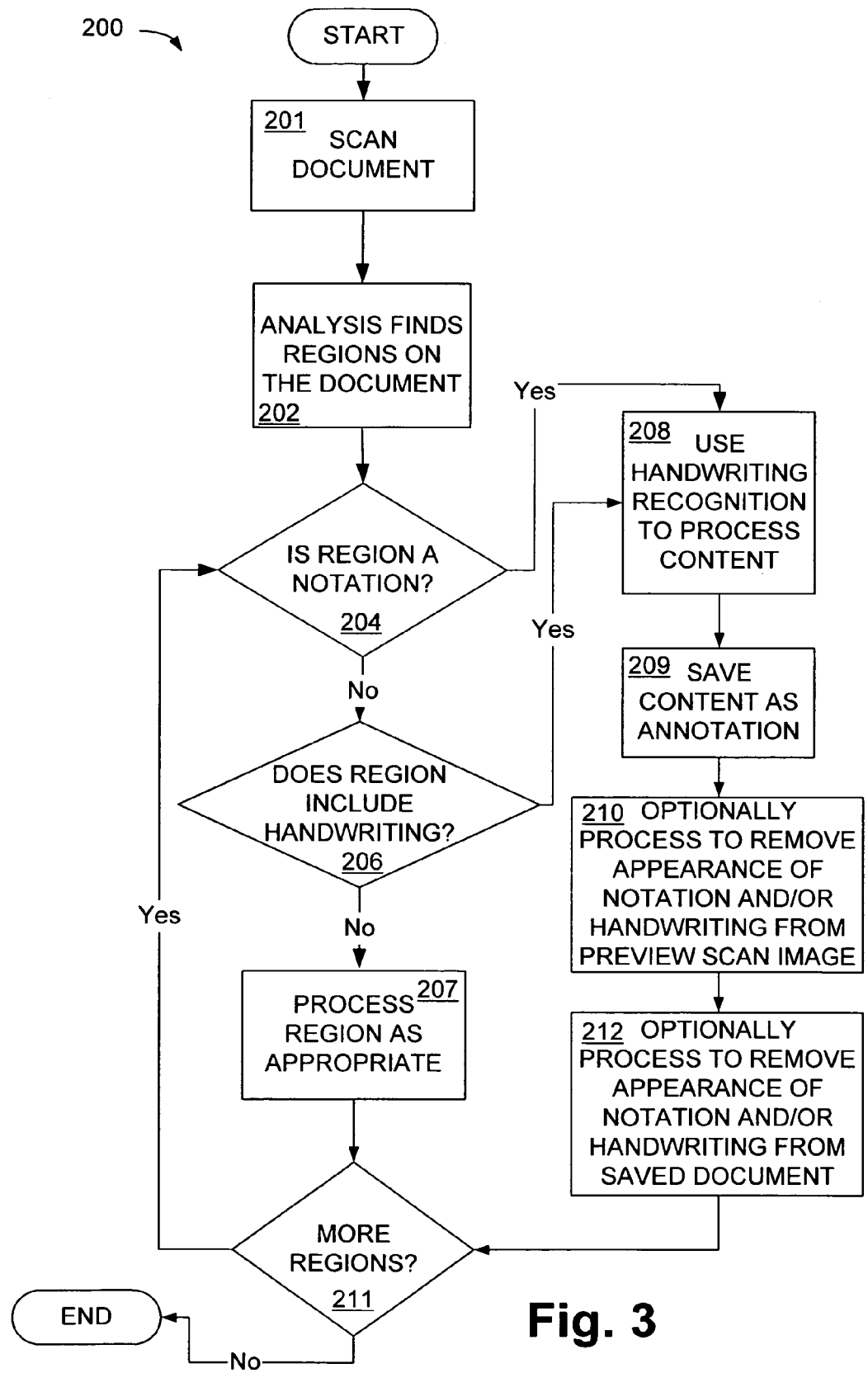
FIG. 3 is a flow diagram illustrating the operation of the automatic annotation logic of FIGS. 1 and 2.

FIG. 3 is a flow diagram collectively illustrating the operation of the automatic annotation logic of FIGS. 1 and 2.

The flow chart of FIG. 3 shows the architecture, functionality, and operation of a possible implementation of the automatic annotation software of FIGS. 1 and 2. In this regard, each block represents a module, segment, or portion of code, which comprises one or more executable instructions for implementing the specified logical function(s). It should also be noted that in some alternative implementations, the functions noted in the blocks may occur out of the order noted in FIG. 3. For example, two blocks shown in succession in FIG. 3 may in fact be executed substantially concurrently or the blocks may sometimes be executed in the reverse order, depending upon the functionality involved, as will be further clarified hereinbelow.

With reference to FIG. 3, in block 201, a document is scanned. In block 202, the analysis and processing logic 17 discovers the different regions on the scanned document. The regions can be anywhere on the document. For illustration purposes, and to be described with respect to FIG. 4, the area of the document in which handwriting was found is the upper right hand portion of a page. This step can be set either by user input (i.e., a user selecting an area on a scanned page through the use of a mouse and pointer), or may be determined by the analysis and processing logic 17.

In block 204, it is determined whether the region under analysis is a notation. This is accomplished through the use of notation detection logic 150 of FIG. 2. As used in this embodiment and as described above, a notation can be a note, the type of which is frequently used for leaving removable notes on a page. A "POST-IT®" note is envisioned in this embodiment because such notes tend to be of different color than the page upon which they are applied. However, the invention should not be construed as limited to any particular type of notation. For example, notes such as these are typically made in noticeable colors of yellow, green, pink, or blue. In this manner, it is possible to detect their presence through the use of color recognition logic 135 such as that described above with respect to FIG. 2. Color recognition and the detection thereof is known to those having ordinary skill in the art and will not be explained in detail herein.

Other techniques for determining the presence of a notation are also possible. For example, logic to detect the presence of a note having a particular shape on a scanned page may be employed by notation detection logic 150 to detect the presence of a notation.

If it is determined that the region of interest is a notation, then, in block 208, handwriting recognition logic 140 (FIG. 2) is used to process the handwriting on the notation. Once the handwriting is processed, then in block 209 the automatic annotation logic 110 saves the handwriting as an annotation to the scanned document. If, in block 204, it is determined that the region under analysis is not a notation, then in block 206 it is determined whether the region of interest includes any handwriting. This is accomplished by using handwriting detection logic 145 (FIG. 2) contained within analysis code 120. If handwriting detection logic 145 discovers handwriting in the region, then in block 208, handwriting recognition logic 140 (FIG. 2) is used to process the handwriting. Once the handwriting is processed, then in block 209 the automatic annotation logic 110 saves the handwriting as an annotation to the scanned document.

After the handwriting is saved as an annotation in block 209, then, in block 210, optional processes can be performed by the analysis and processing logic 17 (FIG. 1). For example, handwriting/notation removal logic 180 can be used to eliminate the appearance of the region and/or the appearance of the handwriting from the preview scan image. In block 212, the analysis and processing logic 17 (FIG. 1) can invoke the handwriting/notation removal logic 180 to eliminate the appearance of the region and/or the handwriting from the document generated and saved from the scanned image. One possible way to do this is to fill the region boundaries with the background color of the document (usually white). After the performance of the optional processes in blocks 210 and 212, it is determined, in block 211, whether there are any more regions to process.

If it is determined in block 206 that the region of interest is not a handwriting region, then in block 207 the region is processed as appropriate for the type of information contained therein. For example, if the region contains text, an optical character recognition process operates on the text in accordance with techniques known in the art. If the region contains a photograph, the photograph is raster scanned and saved in accordance with techniques known in the art.

In block 211 it is determined whether there are any more regions to analyze. If not, then the process ends. If there are additional regions to analyze, then the process returns to block 204.

Figure 4:
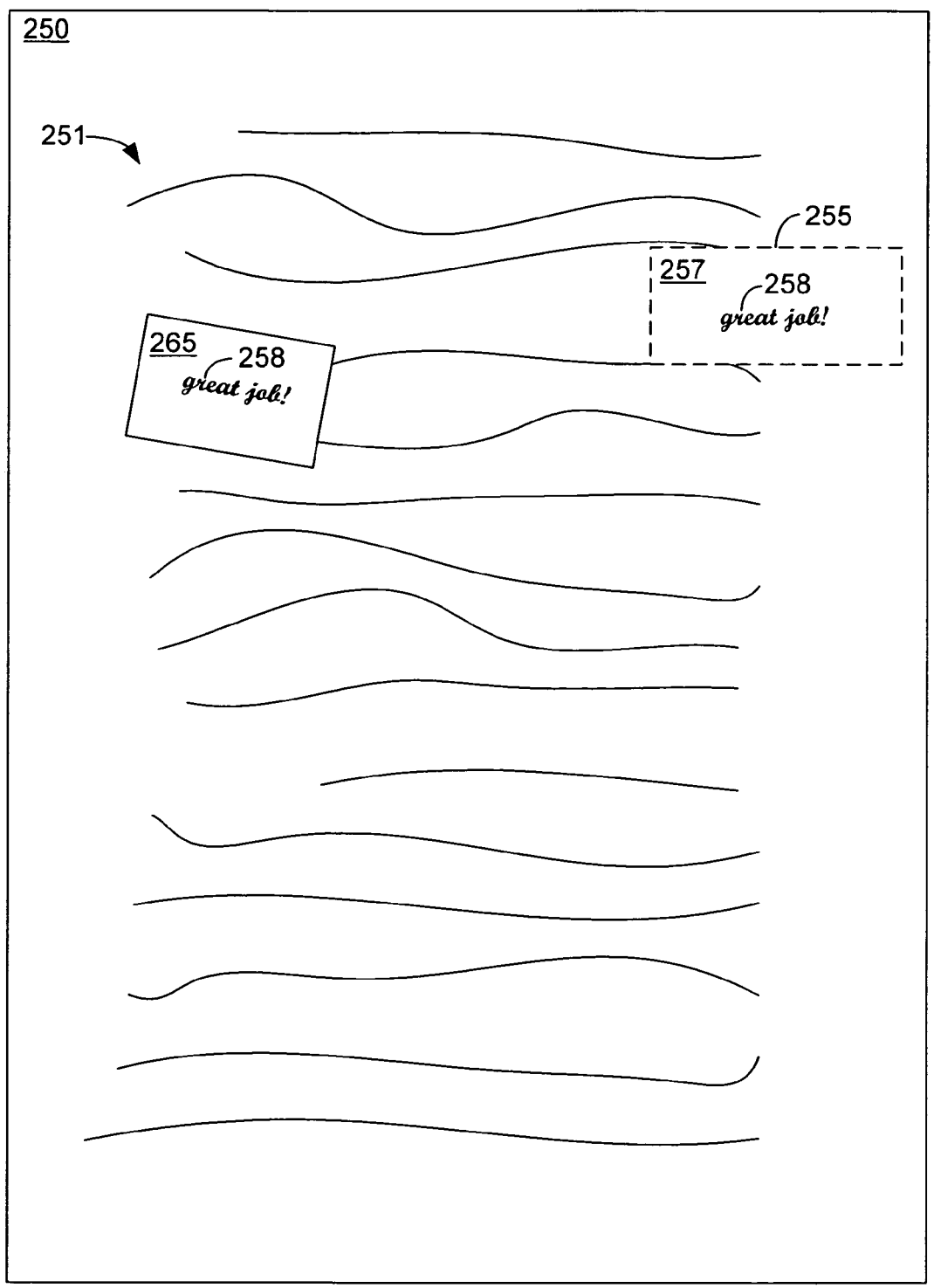
FIG. 4 is a graphical representation of one embodiment of the automatic annotation logic of FIGS. 1 and 2.

FIG. 4 is a graphical representation of one embodiment of the automatic annotation logic 110 of FIGS. 1 and 2. FIG. 4 illustrates sample page 250 on which text 258 is printed, written, or otherwise applied. Also on page 250 is bounding box 255. Bounding box 255 can be indicated by a user of the scanner by using a mouse and pointer to indicate the desired area, or may be determined by the analysis and processing logic 17. Bounding box 255 encloses a region 257, within which the automatic annotation logic 110 and the handwriting recognition logic 140 will analyze to determine whether any handwriting is present.

Regardless of the manner in which handwriting 258 is detected, once detected it is automatically saved as an annotation to the scanned document by automatic annotation logic 110 (FIG. 2).

In the example shown in FIG. 4, writing 258 is present within region 257. Writing 258 includes the text "great job". By searching region 257 and recognizing the text 258, automatic annotation logic 110 will save the text "great job" as an annotation to the scanned document. In addition, the region that contained the handwriting may be removed from the final document, so as to reduce clutter in the document.

In this manner, when the document that is generated from the scanned page is displayed to a user, the user may choose to view the comment "great job" or hide the comment from view.

When the handwriting is saved as an annotation, the user may easily manipulate the handwriting using optional processing applications. For example, the handwriting saved as an annotation may not be visible in the scanned document until a user desires to read the annotation. In such a case, the presence of an annotation at a particular place in a document is indicated to the user by, for example, a superscript identifier or a highlighted color over a portion of the document. If the user desires to read the annotation, the user may indicate this by placing the cursor over the indicated portion of the document, thereby signaling to the application that the user wishes to view the annotation. This is merely one manner in which the annotation may be maintained as invisible in the document. Many other techniques are contemplated.

In an alternative embodiment of the automatic annotation logic 110 of FIGS. 1 and 2, page 250 also includes notation 265. As illustrated in FIG. 4, notation 265 includes the handwriting "great job". When page 250 is scanned, notation recognition logic 150 (FIG. 2) will detect notation 265. Notation 265 will then be analyzed by automatic annotation logic 110 to automatically save the handwriting on the notation as an annotation to the scanned document. Once notation recognition logic 150 detects notation 265, handwriting recognition logic 140 (FIG. 2) will analyze the writing and save the handwriting as an annotation. Optionally, as mentioned above, the automatic annotation logic 110 may operate on the notation so that the appearance of the notation and handwriting is removed from the document. The information that the notation and handwriting conveyed is saved as an annotation.

It will be obvious to those skilled in the art that many modifications and variations may be made to the preferred embodiments of the present invention, as set forth above, without departing substantially from the principles of the present invention. For example, the system and method for saving handwriting as an annotation in a scanned document can be implemented using various scanning and computing products and can be applied to other types of regions. All such modifications and variations are intended to be included herein within the scope of the present invention, as defined in the claims that follow.

What is claimed is:

1. A system comprising:

a scanner;

a document analysis and processing software component in communication with said scanner; and automatic annotation logic in communication with said document analysis and processing software component, said automatic annotation logic configured to detect handwriting in a scanned image and save said handwriting as an annotation in a document generated from said scanned image such that, when a preview image corresponding to the scanned image is displayed to a user via a display device, the annotation is not automatically displayed to the user, said automatic annotation logic being further configured to enable selective viewing of the annotation in association with the preview image.

2. The system of claim 1, wherein said automatic annotation logic is configured to detect said handwriting based on a region in said scanned image selected by a user of said scanner.

3. The system of claim 1, wherein said automatic annotation logic is configured to detect said handwriting on a notation on a page.

4. The system of claim 1, wherein said handwriting is written directly on a page.

5. The system of claim 1, further comprising handwriting recognition logic configured to recognize said handwriting.

6. The system of claim 1, further comprising handwriting/notation removal logic configured to remove the appearance of said handwriting from a preview image created from said scanned image.

7. The system of claim 1, further comprising handwriting/notation removal logic configured to remove the appearance of said handwriting from said document generated from said scanned image.

8. The system of claim 3, further comprising handwriting/notation removal logic configured to remove the appearance of said notation from a preview image created from said scanned image.

9. The system of claim 3, further comprising handwriting/notation removal logic configured to remove the appearance of said notation from said document generated from said scanned image.

10. A method comprising:
scanning a document to acquire a scanned image;
detecting handwriting in said scanned image; and
modifying said scanned image to remove said handwriting from the scanned image such that the handwriting is not automatically displayed to an operator viewing the scanned image via a display device, the handwriting being saved as an annotation associated with said scanned image, the annotation being selectively viewable by the operator.

11. The method of claim 10, further comprising receiving a user selection of a region in which the handwriting is to be detected.

12. The method of claim 10, wherein said detecting comprises detecting said handwriting on a notation on a page.

13. The method of claim 10, wherein said handwriting is written directly on a page.

14. The method of claim 10, further comprising recognizing said handwriting using handwriting recognition logic.

15. The method of claim 10, further comprising removing the appearance of said handwriting from a preview image created from said scanned image.

16. The method of claim 10, further comprising removing the appearance of said handwriting from said document generated from said scanned image.

17. The method of claim 12, further comprising removing the appearance of said notation from a preview image created from said scanned image.

18. The method of claim 12, further comprising removing the appearance of said notation from said document generated from said scanned image.

19. A computer readable medium having a program the program comprising logic for:
scanning a document to acquire a scanned image;
detecting handwriting in said scanned image; and
modifying said scanned image to remove said handwriting from the scanned image such that the handwriting is not automatically displayed to an operator viewing the scanned image via a display device, the handwriting being saved as an annotation associated with said scanned image, the annotation being selectively viewable by the operator.

20. The program of claim 19, further comprising logic configured to receive a user selection of a region in which the handwriting is to be detected.

21. The program of claim 19, wherein said handwriting is on a notation on a page.

22. The program of claim 19, wherein said handwriting is written directly on a page.

23. The program of claim 19, further comprising logic configured for recognizing said handwriting using handwriting recognition logic.

24. The program of claim 19, further comprising logic configured to remove the appearance of said handwriting from a preview image created from said scanned image.

25. The program of claim 19, further comprising logic configured to remove the appearance of said handwriting from said document generated from said scanned image.

26. The program of claim 21, further comprising logic configured to remove the appearance of said notation from a preview image created from said scanned image.

27. The program of claim 21, further comprising logic configured to remove the appearance of said notation from said document generated from said scanned image.

28. A system for processing a document that includes a notation, said system comprising:
analysis and processing logic operative to:
receive information corresponding to a scanned document;
determine whether the information comprises a notation; and
if a notation is identified, process the information such that, when a preview image corresponding to the scanned document is displayed to the user on a display device, the notation is not automatically displayed to the user,
the analysis and processing logic being further operative to selectively display the notation in association with the preview image.

29. The system of claim 28, wherein, in determining whether the information comprises a notation, the analysis and processing logic is operative to:
identify handwriting in the document such that handwriting identified is designated as a notation.

30. The system of claim 28, wherein, in displaying the preview image to the user, the analysis and processing logic is further operative to:
display an identifier corresponding to the notation; and
in response to the user actuating the identifier, display the notation to the user.

31. The system of claim 30, wherein the analysis and processing logic is operative to actuate the identifier in response to the user moving a cursor, displayed by the display device, over the identifier.

32. The system of claim 30, wherein the identifier is a number.

33. The system of claim 30, wherein the identifier is a highlighted portion of the preview image.

34. The system of claim 28, further comprising:
a scanner operative to scan the document and provide information corresponding to the scanned document to the analysis and processing logic.

* * * * *

UNITED STATES PATENT AND TRADEMARK OFFICE
CERTIFICATE OF CORRECTION

| | | |
|---|---|---|
| PATENT NO. | : 7,042,594 B1 | Page 1 of 1 |
| APPLICATION NO. | : 09/521000 | |
| DATED | : May 9, 2006 | |
| INVENTOR(S) | : Julie T Dawe et al. | |

It is certified that error appears in the above-identified patent and that said Letters Patent is hereby corrected as shown below:

On the Title page, in field (56), under "Foreign Patent Documents", in column 2, line 8, below "JP     6340981     12/1994" insert -- JP     6-52236 --.

In column 3, line 63, delete "(RAN)" and insert -- (RAM) --, therefor.

Signed and Sealed this

Nineteenth Day of May, 2009

JOHN DOLL
*Acting Director of the United States Patent and Trademark Office*